United States Patent [19]
Hoang et al.

[11] Patent Number: 6,023,343
[45] Date of Patent: Feb. 8, 2000

[54] METHOD AND APPARATUS FOR TEMPORARY STORAGE ON DISK OF COLLATED PRINT DATA

[75] Inventors: Cuong Manh Hoang; Christopher Lawrence Knapp, both of Lexington, Ky.

[73] Assignee: Lexmark International, Inc., Lexington, Ky.

[21] Appl. No.: 08/921,294

[22] Filed: Aug. 29, 1997

[51] Int. Cl.[7] .............................. B41B 15/00; H04N 1/21
[52] U.S. Cl. ...................... 358/1.16; 358/1.16; 358/1.15; 358/1.1 B; 358/1.111; 358/1.1; 358/296
[58] Field of Search .................................. 358/296, 1.11, 358/1.13, 1.15, 1.16, 1.1; 395/110, 112, 114, 115, 101

[56] References Cited

U.S. PATENT DOCUMENTS

| | | | |
|---|---|---|---|
| 4,872,091 | 10/1989 | Maniwa et al. | 361/424 |
| 5,003,494 | 3/1991 | Ng | 364/519 |
| 5,047,955 | 9/1991 | Shope et al. | 364/519 |
| 5,050,100 | 9/1991 | Damon et al. | 364/514 |
| 5,159,681 | 10/1992 | Beck et al. | 395/425 |
| 5,201,031 | 4/1993 | Kasaki | 395/110 |
| 5,241,662 | 8/1993 | Maniwa et al. | 395/425 |
| 5,297,876 | 3/1994 | Imagawa | 400/61 |
| 5,345,314 | 9/1994 | Ho-II | 358/296 |
| 5,357,607 | 10/1994 | Sathi et al. | 395/166 |
| 5,408,589 | 4/1995 | Yamamoto | 395/101 |

(List continued on next page.)

FOREIGN PATENT DOCUMENTS 0 755 021 A2  1/1997  European Pat. Off. ....... G06K 15/00

OTHER PUBLICATIONS

QMS Crown: Multi-Tasking (URL:http//www.qms.com/www/products/crown.html) Last update Oct. 16,1996.

*Primary Examiner*—Edward L. Coles
*Assistant Examiner*—Twyler Lamb
*Attorney, Agent, or Firm*—John J. McArdle

[57] ABSTRACT

An improved printer is provided that uses a hard disk drive resident in the printer to temporarily store some of the page data of print jobs received by this printer. Since disk access time is relatively slow as compared to access time of random access memory (RAM), only a minimal amount of pages are initially stored on the hard disk drive while the remaining pages of a print job continue to be stored in RAM, such that the pages on the hard disk drive are interleaved with those stored in RAM. Once the pages are stored on the hard disk drive, some of the areas of RAM where they previously resided are released, which allows the printer to free up some of its RAM. In a preferred embodiment of the present invention, only every fourth page is initially stored on the hard disk drive, which effectively spreads out the effects of the slower disk access time across several pages as they are printed. The page data that is stored on the hard disk drive will be divided into tiled "blocks" of print data, so that the individual blocks can be stored in non-contiguous locations within the printer's main memory system of RAM, and later stored on the hard disk drive. If a page of data is to be stored on the hard disk drive, some "empty" space in RAM large enough to hold all of the blocks of data that are being stored on the hard disk drive for this page is reserved in RAM, so that later the blocks that have been stored on the hard disk drive can be retrieved from that drive and will have an immediate place to go in the printer's RAM, which allows the printer to maintain its overall rated printing speed in more situations. These "empty" locations that have been reserved in RAM and known as "shared memory tables," and will contain enough memory locations in the printer's main RAM system to hold all of the compressed bitmap data for all of the blocks for a particular page, or for the "largest" page (in terms of compressed bitmap data) of several pages. If the printer's RAM becomes so scarce that, even after all pages of bitmap data are stored on the disk, the printer still calls for more RAM to be freed, then two or more shared memory tables can be combined with one another in an attempt to make more RAM available to meet the printer's request for more free RAM.

18 Claims, 8 Drawing Sheets

U.S. PATENT DOCUMENTS

| | | | |
|---|---|---|---|
| 5,478,155 | 12/1995 | Sasaki | 400/76 |
| 5,524,186 | 6/1996 | Campbell | 395/115 |
| 5,537,517 | 7/1996 | Wakabayashi et al. | 395/115 |
| 5,548,740 | 8/1996 | Kiyohara | 395/427 |
| 5,553,202 | 9/1996 | Wakabayashi et al. | 395/115 |
| 5,563,987 | 10/1996 | Scott | 395/115 |
| 5,579,452 | 11/1996 | Ambalavanar et al. | 395/115 |

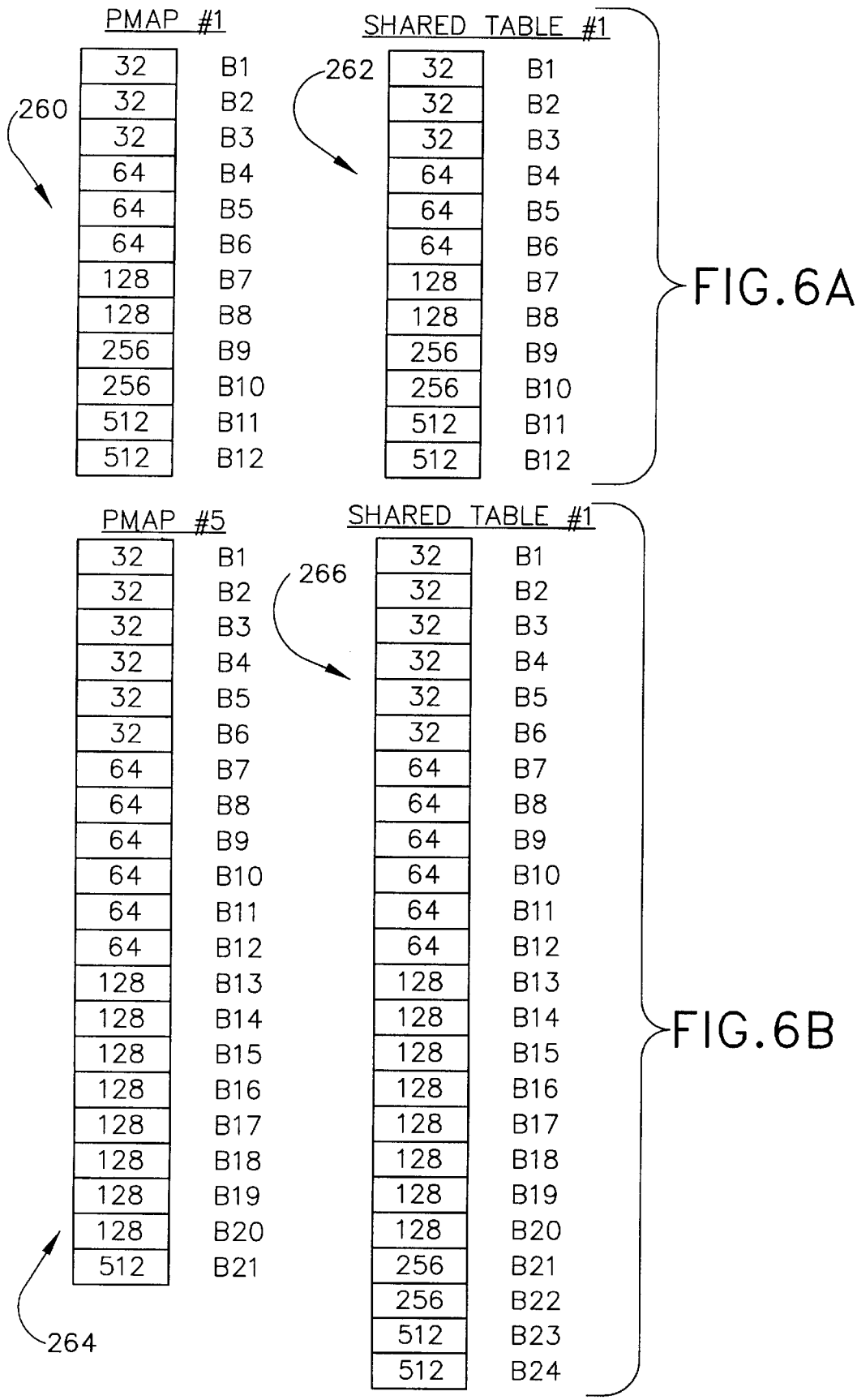

METHOD AND APPARATUS FOR TEMPORARY STORAGE ON DISK OF COLLATED PRINT DATA

TECHNICAL FIELD

The present invention relates generally to printing equipment and is particularly directed to laser printers of the type which are capable of printing collated multiple original copies of the same print job. The invention is specifically disclosed as a laser printer that stores compressed bitmap data for individual pages of a print job onto a hard disk drive located within the printer, in which it is preferred (when possible) to store only a portion of the pages of the print job on the hard disk, and in which the storage of the pages is interleaved between random access memory and the hard disk drive.

BACKGROUND OF THE INVENTION

Collation in most conventional printers has been accomplished by storing pages in random access memory (RAM) only, which meant that the maximum size of the collated print job depended upon how much RAM was installed in the printer. In some newer printers, an optional hard disk drive can be installed to provide a printer the means to store more collated pages than it otherwise could by storing such pages only in RAM. The hard disk can also be used to buffer incoming print jobs, and to store permanent fonts and macros.

An example of this type of printer is disclosed in a European patent application number EP 0 755 021 A2 which can receive a single transmission from a host computer that describes an entire collated multi-page document, in which the printer can automatically print multiple original collated copies of the document. The data transmitted by the host computer includes not only the print data, but a variable that indicates how many copies are to be printed at the printer. If more than one original copy is to be printed by the printer, a hard disk at the printer can be used to store the print data until after all the copies have been printed. The print job is saved as datastream bytes in a high-level language, such as one of the PCL languages. Since the data is saved in a high-level language, the printer must rasterize the print data each time the next copy of the document is to be printed, which is a serious limitation as far as attempting to maintain the printer's overall rated print speed.

An improvement over the printer disclosed in the above-referenced European patent application is described in U.S. Pat. No. 5,047,955, where the host computer sends a multi-page document to the printer in the form of character code signals, after which the printer can rasterize the print data and store the rasterized data so that a plurality of collated sets of the document can be printed without re-rasterization.

Another improvement that has been disclosed is a printer called "QMS Crown," which is a printer that quickly transfers incoming print jobs received from a host computer into input buffers for processing at the earliest possible moment. This helps to prevent network logjams, and also provides an advanced paper handling capability for features such as multi-page job collation. When the QMS printer receives a print job in a high-level language format, rather than rasterizing the entire page the printer compiles the page into an intermediate "QMS display list." If the printer is currently busy printing another job, the intermediate blocks of data are stored in the printer's RAM until the printer becomes available for this job. By separating the printing process into two operations of compiling and rasterizing, the printer does not have to re-create an entire page from scratch each time the page is printed (as part of a multiple original collated set of copies). Therefore, the more time-consuming compilation operation is done only once per page, and when multiple copies are to be printed, the rasterizer processes these intermediate blocks as needed by the print engine. An optional hard disk drive can be included in the printer, which creates a "virtual memory" that allows data in RAM to spill over onto the hard disk, thereby eliminating the need for additional print server hardware at the other end of the network.

Since disk access time is relatively slow (at least compared to RAM), it typically is not possible to read page data from a disk quickly enough to consistently keep up with the imaging (i.e., the actual printing on the print media) of a page that is moving through the printer, at least not at the printer's overall rated speed. Therefore, the page must usually be read from the disk into RAM before launching that page through the print engine. Moreover, if too many consecutive pages of a print job are stored on a hard disk, it may be impossible to retrieve those pages quickly enough to print at the printer's overall rated print speed.

SUMMARY OF THE INVENTION

Accordingly, it is a primary object of the present invention to provide a printer that is capable of maintaining its overall rated print speed (in pages per minute) even though some of the page data is temporarily stored on a hard disk drive at the printer.

It is another object of the present invention to provide a printer that, when storing print data onto a hard disk drive, interleaves page data in a compressed bitmap format between RAM and a hard disk drive, so as to maintain its overall rated print speed.

It is a further object of the present invention to provide a printer that interleaves page data between RAM and a hard disk drive, and uses a shared memory table to reduce the memory overhead requirements in RAM while storing such pages on the hard disk drive.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved printer is provided that uses a hard disk drive resident in the printer to temporarily store some of the page data of print jobs received by this printer. Since disk access time is relatively slow as compared to access time of random access memory (RAM), only a minimal amount of pages are initially stored on the hard disk drive while the remaining pages of a print job continue to be stored in RAM. Once the pages are stored on the hard disk drive, some or all of the areas of RAM where they previously resided are released, which allows the printer to free up some of its RAM to become available to hold data used either for other print jobs or for other operations of the printer.

Since only certain pages are stored on the hard disk drive, while other pages remain in RAM, generally it will be possible for the printer to continue printing the entire print job at the printer's overall rated print speed, especially when, for example, only every fourth page has been stored on the disk while the other three pages are immediately available in RAM. In a preferred embodiment of the present invention, only every fourth page is stored on the hard disk drive, and this effectively spreads out the effects of the slower disk access time across several pages as they are printed. If more and more RAM area is requested by the printer either before or while a print job is currently printing at the print engine, then it may become necessary to store more pages on the hard disk drive, such as every third page, and if the trend continues to demand more RAM area for other functions, then every second page will be stored on the hard disk drive. In many printers, the overall rated print speed can still be maintained even when every second page is temporarily stored on the hard disk drive, so long as the interleaving pages remain in RAM.

In the preferred embodiment, if the requests for memory space become so burdensome that even more pages of the print job must be stored on the hard disk drive, then the printer of the present invention will finally begin to store every single page on the hard disk drive, and this procedure could continue until no pages at all are left in RAM. In this situation, the printer of the present invention may not be able to continue printing at its rated print speed, although the use of shared memory tables will alleviate some of the effects of the "lost" speed by adding further efficiency.

In another aspect of the present invention, the page data that is stored on the hard disk drive will be divided into "blocks" of print data, in the first place so that the individual blocks can be stored in non-contiguous locations within the printer's main memory system of RAM, and second, when these non-contiguous blocks of data are later retrieved from RAM and then stored on the hard disk drive. As is common in modern conventional laser printers, each page of print data is rasterized into a bitmap of individual pels (i.e., "print-elements"), and these individual pels are stored as individual bits in data words that are stored in the printer's RAM. By a process well known in the art, the bitmap representing the entire page is divided into rectangles that each represent a portion of the physical surface area of the page to be printed, and these individual rectangular "blocks" are "tiled" next to one another in a manner that provides more than one block per individual line of pels to be printed across the page in a horizontal manner by the laser. Such a page of print data is referred to as a "PMAP." Each rectangular physical block can be made up of, for example at 600 dots per inch (dpi), of 512 columns by 128 rows, which requires about 8 Kbytes of RAM to store this data. When using some of the more powerful microprocessors available today, the unit of data storage is often referred to as a "word", which will either represent a 16-bit "chunk" of bitmap data, or a 32-bit "chunk" of data. For the purposes of the present invention, it is assumed that the size of a data word will be thirty-two (32) bits, and so the entire uncompressed bitmap for a single block would require 2 Kwords of RAM.

Since it is preferred to store bitmap data in a compressed format, each individual block of bitmap data will typically compress down to a much smaller size than 2 Kwords. For a very simple page, it potentially is possible to have only a few blocks that require "black" pels to be physically printed on the page of print media. In such a case, the compressed data for this page would only require a few blocks to be stored, first in RAM, and later on the hard disk drive (if necessary to free up some portions of the RAM for other printer operations). If a page of data is to be stored on the hard disk drive, it is important to reserve some "empty" space in RAM that is large enough to hold all of the blocks of data that are being stored on the hard disk drive for this page. If this is properly done, then the blocks that are stored on the hard disk drive can be retrieved from that drive and will have an immediate place to go within the main memory system of the printer, thereby allowing the read operation from the hard disk drive to be performed very quickly in which the blocks of data will be quickly stored in RAM in these "empty" memory locations, and then very quickly sent off to the print engine. This is another important aspect of the present invention that allows the printer to maintain its overall rated printing speed in more situations.

The "empty" RAM that has been reserved to hold the compressed bitmap data for the blocks that have been stored on the hard disk drive for a page of print data is referred to herein as "shared memory." The locations of the shared memory blocks are organized in "shared memory tables." As related in the above paragraph, the shared memory table will contain enough memory locations in the printer's main RAM system to hold all of the compressed bitmap data for all of the blocks for a particular page. The word "shared" in this title for these memory tables comes into effect when more than one page of bitmap data is to be stored on the hard disk drive, since the shared memory table only need contain enough RAM to reserve sufficient memory locations to hold the individual blocks of the "largest" page (of compressed bitmap data) that will be stored on the hard disk drive for a particular print job. In other words, if Page 1 of the print job is first stored on the hard disk drive, then all of the blocks that make up that Page 1 will have empty areas reserved in RAM so that when that Page 1 is retrieved from the hard disk drive and stored back in RAM, these empty blocks will be immediately available to hold that data. However, when the next page (e.g., Page 5) is to be stored on the hard disk drive, if it has either fewer or the same number of blocks that were on Page 1, then the shared memory table in RAM that was previously only reserving memory space for Page 1 need not increase the number of memory spaces to be sufficiently large to hold individual blocks for Page 5. Furthermore, if the physical size of the data for the individual blocks of Page 5 are either smaller or the same as for Page 1, then the individual memory space being held open for each of the blocks of Page 1 need not be increased for the purposes of also being able to store the same type of print data for Page 5 when it becomes retrieved from the hard disk drive. As will be clear to one of ordinary skill in the art, the shared memory table will save RAM space by only holding in reserve enough blank or "empty" memory locations in the printer's main RAM to hold the page of the entire print job having the largest amount of compressed bitmap data with respect to the individual blocks that make up that page. This concept will be explained in greater detail hereinbelow, in the Detailed Description of the Preferred Embodiment.

A further aspect of the present invention is to have more than one shared memory table for storing the block data of the individual pages for a single print job. As related above, in the preferred embodiment the printer will initially save only every fourth page on the hard disk drive. This can be accomplished by saving, for example, Pages 1, 5, 9, 13, . . . , etc., if necessary. If it becomes necessary to free up even more RAM to facilitate the printer's other operations, then every second page can be stored on the hard disk drive. When this occurs, the Shared Memory Table #1 will hold enough RAM to reserve the appropriate block space for Pages 1, 5, 9, etc., and a second table, called the Shared Memory Table #2 will hold empty RAM locations to hold the blocks for Pages 3, 7, 11, 15, etc.

Finally, if every single page of the print job must be stored on the hard disk, then two more shared memory tables can be used to store the other page numbers that are interleaved between the page numbers listed above. In this manner, for a print job having 100 pages comprising the document, the printer's RAM would only need to contain enough blank or empty memory locations to hold block data for the four different shared memory tables (i.e., Shared Memory Table # 1, Shared Memory Table #2, Shared Memory Table #3, and Shared Memory Table #4) which would be relatively equivalent to holding enough memory for four pages of block data, rather than the total of 100 pages that make up the entire print job. In this circumstance, even where each one of the 100 pages of the this print job had been stored on the hard disk drive, all 100 pages will be retrieved off the hard disk drive and quickly loaded into the shared memory tables in RAM so that this data transfer will take place as quickly as possible, and then further transferred into the print engine. In this manner, while the printer may not be able to maintain its overall rated print speed for the entire document, it will nevertheless print at the fastest possible rate, and will be essentially limited only by the disk access time to read data from the disk.

In another aspect of the present invention, if free RAM becomes even more scarce such that all of the pages for all of the print jobs presently queued in the printer are off-loaded onto the hard disk drive, and the printer nevertheless needs more RAM for its various operations, then it is possible to begin combining the shared memory tables with one another. In this mode of operation, it would be preferable to combine only two of the shared memory tables together to start with, thereby starting with four (4) shared memory tables, and ending up with three (3) shared memory tables. If this procedure does not free up enough memory in RAM, then the other two (2) shared memory tables can be combined, thereby starting with three (3) shared memory tables, and ending up with two (2) shared memory tables. Finally, these last two (2) shared memory tables can be combined, leaving only a single shared memory table. Of course, once the shared memory tables begin combining with one another, then some of the data being retrieved from the hard disk drive will be slowed down to a certain extent because there will not always be an empty place in RAM ready to receive the blocks of bitmap data for each of the pages. Instead, each page being retrieved from the hard disk drive will have to wait until the previous page has been retrieved from the hard disk drive, loaded into the shared memory table, then off-loaded from the shared memory table to the buffers that feed the print engine, before the next page can be brought into the shared memory table from the hard disk drive.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 2, comprising

FIGS. 6A and 6B are diagrammatic views of a second example showing the details of bitmap blocks of print data for a page that is placed on a hard disk drive, in which the blocks of data correspond to "empty" memory locations in RAM by a shared memory table.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
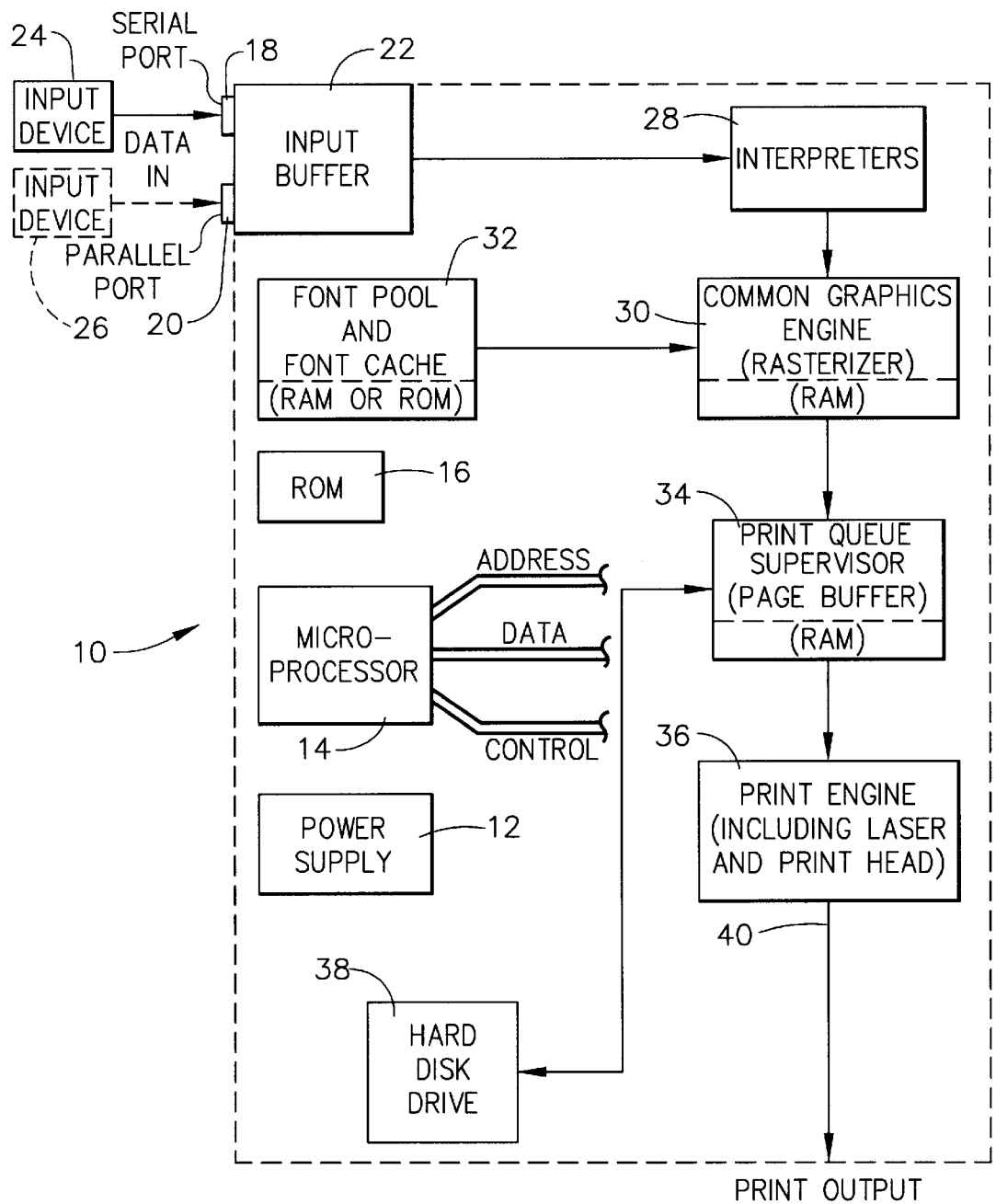
FIG. 1 is a block diagram of the major components of a printer, as constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided by software operations into several portions for performing several different functions.

Laser printer 10 also contains at least one serial input or parallel input port, or in many cases both types of input ports, as designated by the reference numeral 18 for the serial port and the reference numeral 20 for the parallel port. Each of these ports 18 and 20 would be connected to a corresponding input buffer, generally designated by the reference numeral 22 on FIG. 1. Serial port 18 would typically be connected to a serial output port of a personal computer or a workstation that would contain a software program such as a word processor or a graphics package or computer aided drawing package. Similarly, parallel port 20 could be connected to a parallel output port of the same type of personal computer or workstation containing the same types of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is typically sent to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a Print Queue Supervisor or page buffer, which is a portion of RAM designated by the reference numeral 34. In a typical laser printer, an entire page of rasterized data is stored in the Print Queue Supervisor during the time interval that it takes to physically print the hard copy for that page. The data within the Print Queue Supervisor 34 is communicated in real time to a print engine designated by the reference numeral 36. Print engine 36 includes a laser light source within its printhead (not shown), and its output 40 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers.

Print engine 36 contains an ASIC (Application Specific Integrated Circuit) (not shown), which acts as a controller and data manipulating device for the various hardware components within the print engine. The bitmap print data arriving from Print Queue Supervisor 34 is received by print engine 36, and at the proper moments is sent in a serialized format to the laser printhead.

A hard disk drive 38 is installed in laser printer 10, and it can receive rasterized bitmap data from the Print Queue Supervisor 34. It also can supply data back to the Print Queue Supervisor, so that the data can be passed to the print engine 36. In order to save memory space, the rasterized bitmap data at this point in the printer will typically be compressed, and will be transferred from the printer's RAM to the hard disk drive 38 in various "chunks" of data that correspond to a physical "block" that, in turn, corresponds to one of the rectangles that make up the surface area of the page that will be printed. The physical blocks of bitmap data stored in RAM (i.e., as electronic digital data that makes up a "PMAP") will have a one-to-one correspondence with the chunks of digital data that will be stored on the hard disk. In the preferred embodiment of the present invention, shared memory will be reserved in RAM as "empty" or blank data so that the blocks of data can be retrieved from the hard disk drive 38 and quickly stored back in RAM. If only one page of data is being stored on the hard disk drive 38, then the shared memory table will not actually be shared with more than one page of PMAP data. However, if more than one page of data is stored on the hard disk drive 38, then the shared memory table is used to store only a single set of empty or blank data by reserving in RAM enough storage capacity to store the largest page of the plurality of pages that have been downloaded on the hard disk drive. The shared memory tables concept will be described in greater detail hereinbelow.

Figure 2A:
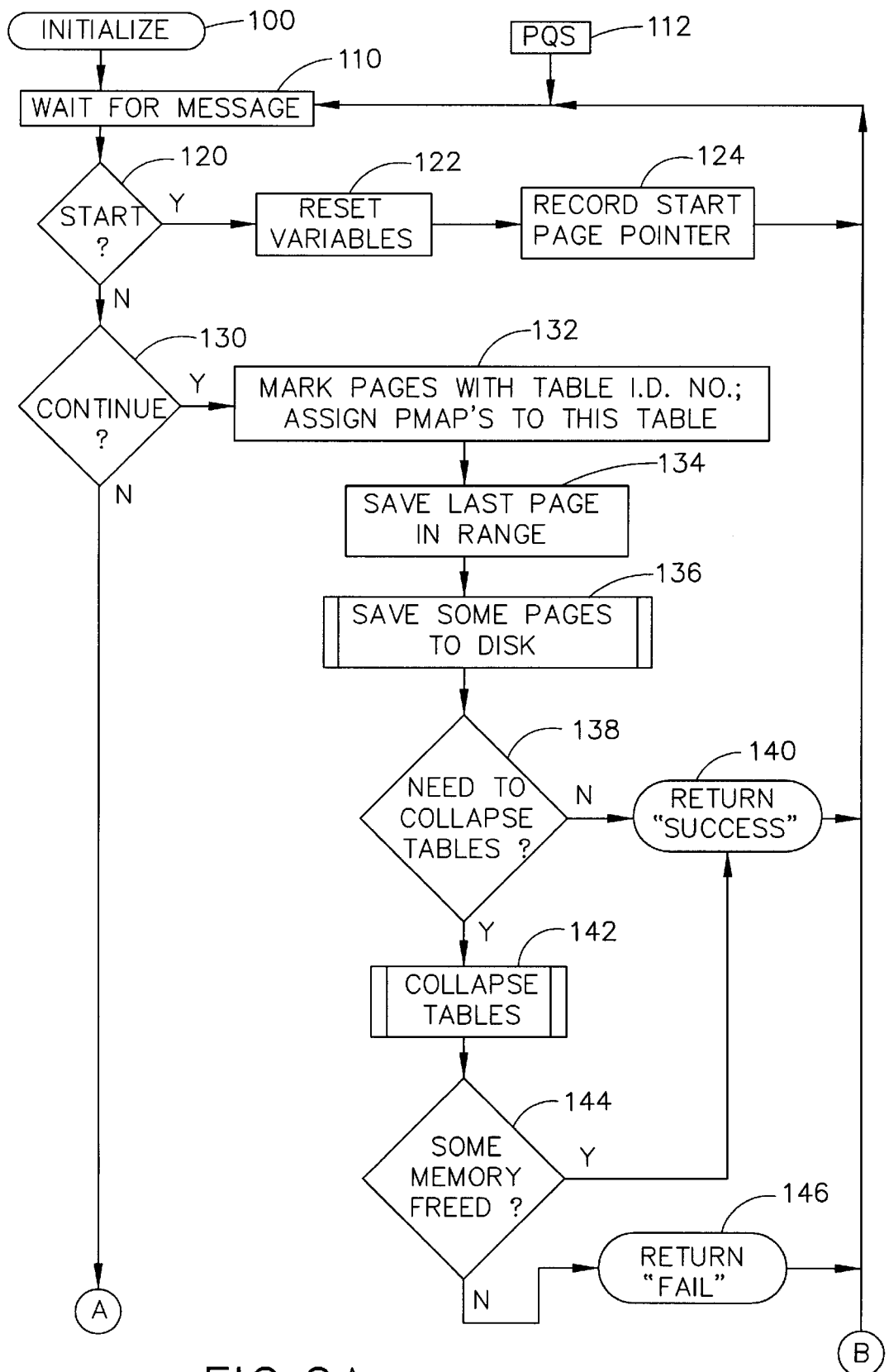
FIGS. 2A and 2B, is a flow chart of the higher-level functions that logically occur to perform the disk collation tasks as according to the principles of the present invention.
Figure 2B:
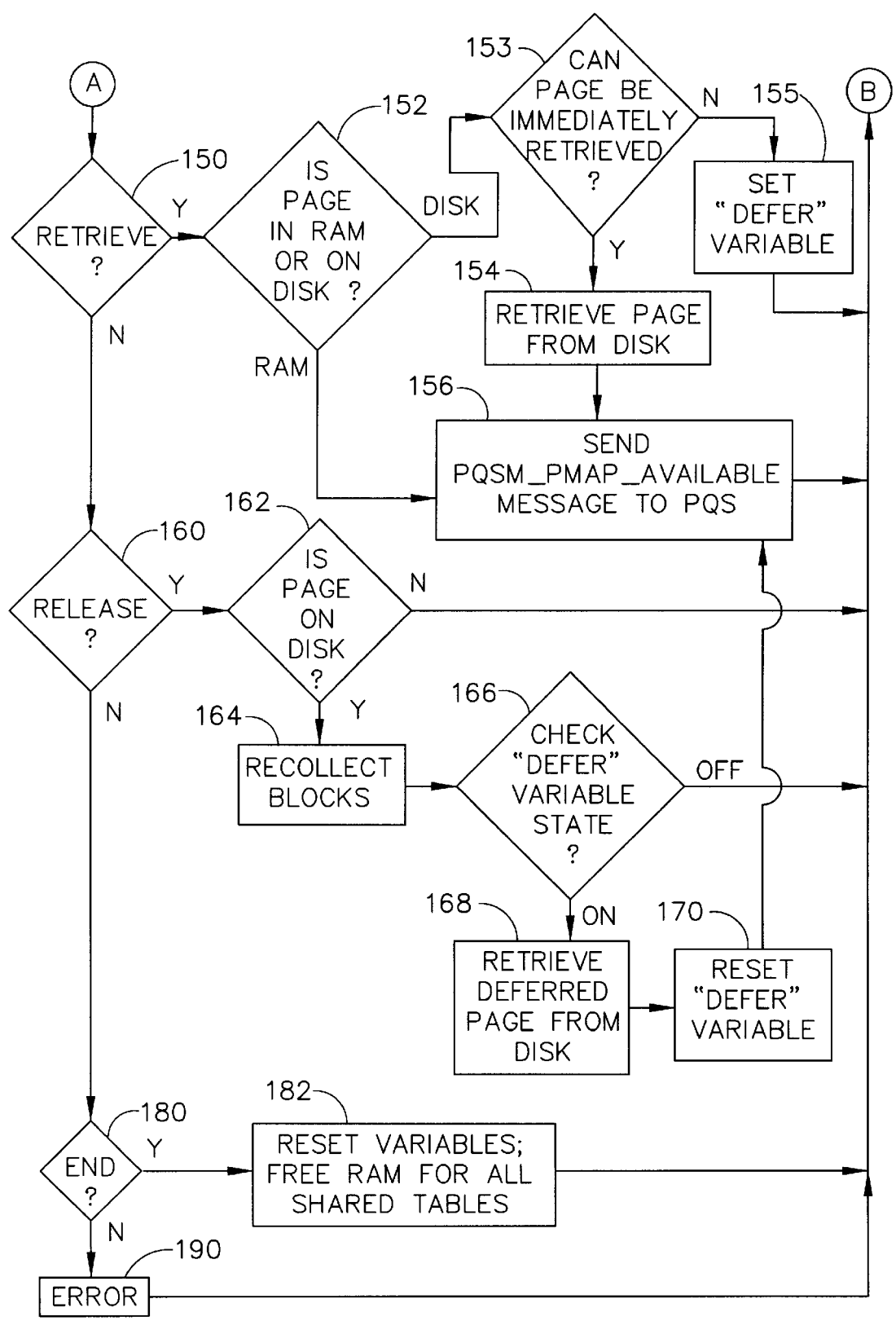

FIG. 2 (i.e., the combination of FIGS. 2A and 2B) is a flow chart depicting the logical operations that are performed when the "Disk Collation Task" is called for by printer 10. As related above, the Disk Collation Task is used at times when the printer's main memory system (i.e., its RAM) becomes so full of data that the printer begins operating in a mode where it must request some RAM space to be freed so that the printer can perform the next function according to its overall control program. It will be understood that printer 10 is a multitasking machine and effectively performs several tasks simultaneously in real time. After initialization at reference numeral 100, the logic flow is directed to a function block 110 where this Disk Collation Task waits for a message that will inform the Task to continue down the flow chart of FIG. 2. In the meantime, printer 10 is performing many other important tasks, such as receiving print data from an external host computer, rasterizing that data, and perhaps compressing the rasterized data. The Disk Collation Task can be commenced by the Print Queue Supervisor 34, and any such message enters the flow chart of FIG. 2 from the "PQS" function block 112.

As related above, the principal reason that the Disk Collation Task is called upon is to free up some memory space in RAM, and the most likely time this will occur is after the printer 10 has already stored a number of pages of compressed, rasterized bitmap print data in RAM. This will even more likely occur if more than one print job is resident within printer 10, in which all of each of these print jobs have pages stored in the printer's RAM. During times of heavy printer usage, numerous print jobs could pile up inside printer 10 if such print jobs are received over a very fast data link, and where the print engine 36 cannot keep up with the incoming print jobs.

By the time the printer's operations are directed to the Disk Collation Task, the print job data preferably will be in a compressed bitmap format, and the page data is further broken into individual rectangularly-shaped "blocks" that are tiled next to one another across the surface of the page to be printed. A set of these physical blocks for an entire page is generally referred to as a "PMAP." This form of division of the page data is common in modern printers, because breaking up the page data into separate blocks that can be individually stored in RAM allows the printer to store more pages more efficiently, since many small blocks will fit into memory (e.g., at non-contiguous locations) better than one large bitmap for the entire page. Furthermore, a different type of data compression can be applied to each block (i.e., to allow for a greater compression ratio in some cases), thereby allowing the printer to store even more blocks.

Once RAM becomes scarce within printer 10, the Print Queue Supervisor 34 will send a message from function block 112 asking the Disk Collation Task to begin storing pages of print data on the hard disk drive 38. It is most desirable to use this optional hard disk drive within the printer in a manner that allows the printer to continue printing at its overall rated speed, and therefore, the present invention preferably begins storing only every fourth page to the hard disk. If the storing of these one out of four pages in disk frees up enough memory space for the printer to continue its operations, then it can be easily seen that only every fourth page being printed for this particular print job need be retrieved off the hard disk. This leaves the other three out of four pages in RAM, which can of course be retrieved very quickly for presentation to the print engine 36 as needed. The effect of the slower access time of the hard disk drive will then be spread across several pages, which allow the printer to maintain its overall rated print speed more often.

Another beneficial aspect of the present invention is the use of "shared memory tables" in which some of the RAM that was used to store pages of print data that later have been stored on the hard disk drive 38 is retained by the Disk Collation Task, so that there will be some free memory into which these saved pages on the disk can be read. The shared memory tables hold pointers to the blocks of the pages that have been stored on the hard disk drive. In addition, this free memory comprising the shared memory tables is kept in linked lists of free memory blocks, which are sorted by size. Each of these linked lists represents a different range of quantity of words (i.e., depending upon how many data words are required for storing the compressed bitmap data for each particular block), and the shared memory table contains pointers to all of these lists.

Each shared memory table will always contain the minimum number of blocks into which each page that has been saved on the hard disk drive can be read. When more than one page of data is saved on the hard disk drive for an individual shared memory table, the unnecessary memory blocks used by the PMAP's will be freed for use by the printer (e.g., when it requests more free memory space in RAM).

In the preferred embodiment, more than one shared memory table is used so that several pages of print data can be read back from the hard disk drive into RAM at one time. If four (4) shared memory tables are used, the printer of the present invention can typically print at its overall rated speed, even if every page of the print job has been saved to the hard disk drive. This is possible since the printer's RAM has reserved the empty space needed to accept the bitmap data of the individual blocks for each page that has been saved on the hard disk drive.

The shared memory tables are created at initialization (i.e., at step 100), however, the tables at this point contain no blocks of print data. When a page is to be stored on hard disk drive 38, its bitmap data blocks are inspected during this process, and sufficient RAM for the shared memory table is reserved in "chunks" that will hold the compressed data for these blocks. If this is the first page saved to disk after commencing the Disk Collation Task, then the shared memory table will reserve for itself the same exact RAM memory locations that previously held the actual print data for this page. When collecting blocks for one of the shared memory tables, the number of blocks that comprised the first page are reserved for this table, and this number of blocks is equal to the number of blocks that are being stored on the hard disk drive for this same page.

When collecting blocks for the second page that will use the same shared memory table, if a block of the first page was large enough (in the number of data words it contained) to also store a block of the second page, then the block of the second page has its RAM freed for the printer's other uses. If a block of the second page is larger in data word size than any block collected for the first page, then the printer must reserve a new "chunk" of RAM sufficient in size to hold that second page's block. In this circumstance, one of the blocks that was collected for the first page would likely be freed, and for example, the largest block that was collected for the first page could probably be freed since the second page block was even larger. Moreover, if the second page has more individual blocks than did the first page, then the shared memory table must add enough RAM to hold the further individual blocks needed to hold the entire second page, block-by-block.

If the RAM of the printer continues to remain scarce even after every single page of every print job resident in the printer has been stored on hard disk drive 38, then the shared memory tables can be combined in order to free up some more RAM. When this occurs, the printer's overall rated printing speed may be compromised, since it will now take more time to pull off the pages of print data that have been stored on the hard disk drive 38, since there are not as many shared memory tables available to receive those blocks of data for each page. The combining of shared memory tables is discussed in greater detail hereinbelow, and is referred to as the "Collapse Tables" routine, depicted on FIG. 8.

Once a message from the PQS 112 is received at function block 110, the logic flow is directed to a decision block 120 that determines whether or not a "Collate Start" command was the message. If the answer is YES, the logic flow is directed to a function block 122 that resets the important variables relating to the Disk Collation Task. The types of variables that are reset at this point include a variable called "Collate ID," which relates to one of the shared memory tables, a "Mortification Level" variable is set to zero (0), and the number of processed PMAP's for this particular print job is set to the number of pages in this print job that have been processed by the interpreter 28 and the common graphics engine 30.

After the reset of these variables has occurred, a function block 124 records the start page pointer, which typically would be the pointer to the first block of Page 1 of this print job. After this has occurred, the logic flow returns to the "Wait for Message" function block 110.

If the result at decision block 120 was NO, a decision block 130 determines whether or not the message was a "Collate Continue" message. If the answer is YES, a function block 132 marks the pages of this print job with the identification number of the shared memory table each page will be assigned to, and the blocks of the corresponding PMAP's are implicitly assigned to the proper shared memory table. Two pieces of information are given to the Disk Collation Task at this time, including the size of the main RAM that needs to be freed, and a pointer to the last page of the collation sequence for this print job that has been submitted to the Print Queue Supervisor 34 (which also represents the last page that has been rendered). A function block 134 saves the last page pointer in the range of pages for this print job.

At step 136, a routine called "Save Some Pages to Disk" will write individual pages of data for this print job to hard disk drive 38 until sufficient RAM has been freed. Routine 136 is described in detail in the flow chart of FIG. 7, and in general, the Disk Collation Task will go through the list of pages for the particular print job of interest from its first page to its last page, and will save one page at a time to hard disk drive 38 until the size goal (i.e., the amount of RAM that needs to be freed) has been reached. If the size goal is reached, a "success code" is returned to the printer's main control system, however, this does not guarantee that enough memory will be available to satisfy the original request. This is so because the memory may be fragmented to an extent that the largest available block of freed RAM is too small to satisfy the request. If that occurs, then the Print Queue Supervisor 34 will repeatedly send additional "Collate Continue" commands until sufficient RAM (in all respects) has been made available.

After routine 136 has been completed, a decision block 138 determines whether or not the shared memory tables need to be combined (or "collapsed") and if so, a routine at reference numeral 142 called "Collapse Tables" will be called to do so. If the result was NO at decision block 138, the Disk Collation Task is finished and returns a "success" message at step 140.

If the shared memory tables need to be combined, then the four (4) tables will be combined into three (3), then two (2), and finally one (1), if necessary by the routine 142. This "Collapsed Tables" routine is described in greater detail hereinbelow, as related to the flow chart of FIG. 8. After two of the tables have been combined into a single table, a decision block 144 will determine whether or not some memory was freed. If the answer is YES, then step 140 returns a "success" message. If the answer is NO, a step 146 will return a "fail" message.

Following the logic from FIG. 2A to FIG. 2B at the letter "A," if the message at 110 is a "Retrieve Sheet" message, a decision block 150 will direct the logic flow to another decision block 152. The Retrieve Sheet task is used to bring a page that may have been saved on the hard disk drive into the printer's RAM so it can be printed. The page to be retrieved is specified by pointers contained in the Retrieve Sheet message. Decision block 152 determines whether the requested page is in RAM or on the hard disk drive. If the page is in RAM, then the logic flow is immediately directed to a function block 156 that sends a message called "PQSM_PMAP_AVAILABLE" to the Print Queue Supervisor 34, and the Disk Collation Task returns to function block 110 via letter "B."

If the page requested is on the hard disk drive, then a decision block 153 determines whether or not the requested page can be immediately retrieved from hard disk drive 38. If so, a function block 154 retrieves that page from hard disk drive 38 by collecting the blocks for this page and storing them into the appropriate shared memory table, then "locks" the page so that it cannot be released. Function block 156 now sends the "PQSM_PMAP_AVAILABLE" message to the Print Queue Supervisor (PQS) to indicate that the page is now in RAM. If decision block 153 determines that the requested page cannot be immediately retrieved from the hard disk drive, then a function block 155 sets a "Defer" variable so that the Disk Collation Task can go on to perform other functions instead of remaining "stuck" at function block 154.

If the message at block 110 is a "Release PMAP" message, then a decision block 160 directs the logic flow to a decision block 162 that determines whether or not the particular page is stored on hard disk drive 38. This "Release PMAP" message tells the Disk Collation Task that the Print Queue Supervisor no longer needs the page in memory since, for example, it already has been printed. If the page was not on the hard disk drive, then the logic flow is directed out the NO output and the Disk Collation Task returns.

If the page is on the hard disk drive, then the Disk Collation Task is free to unlock the page and recollect the blocks of the page's PMAP's into the shared memory table and discard the page data. This occurs at a function block 164 after the logic flow is directed out the YES output from decision block 162. A decision block 166 now checks the state of the "Defer" variable. If the Defer variable is OFF, then the Disk Collation Task immediately returns. If the Defer variable is ON, then a function block 168 retrieves the deferred page from hard disk drive 38. A function block 170 then resets the Defer variable, and the logic flow is directed back to block 156, which sends a PQSM_PMAP_AVAILABLE message to the PQS, to indicate that the page is now in RAM.

If the message at block 110 is a "Collate End" message, then a decision block 180 will direct the logic flow to a function block 182 that resets the same variables that were reset back at function block 122. In addition, all shared memory tables have their RAM freed for future use by the next print job. The Disk Collation Task then returns. If decision block 180 determines that the message was not a "Collate End" message, then the logic flow is directed to an error state at step 190, and the Disk Collation Task returns.

Figure 3:
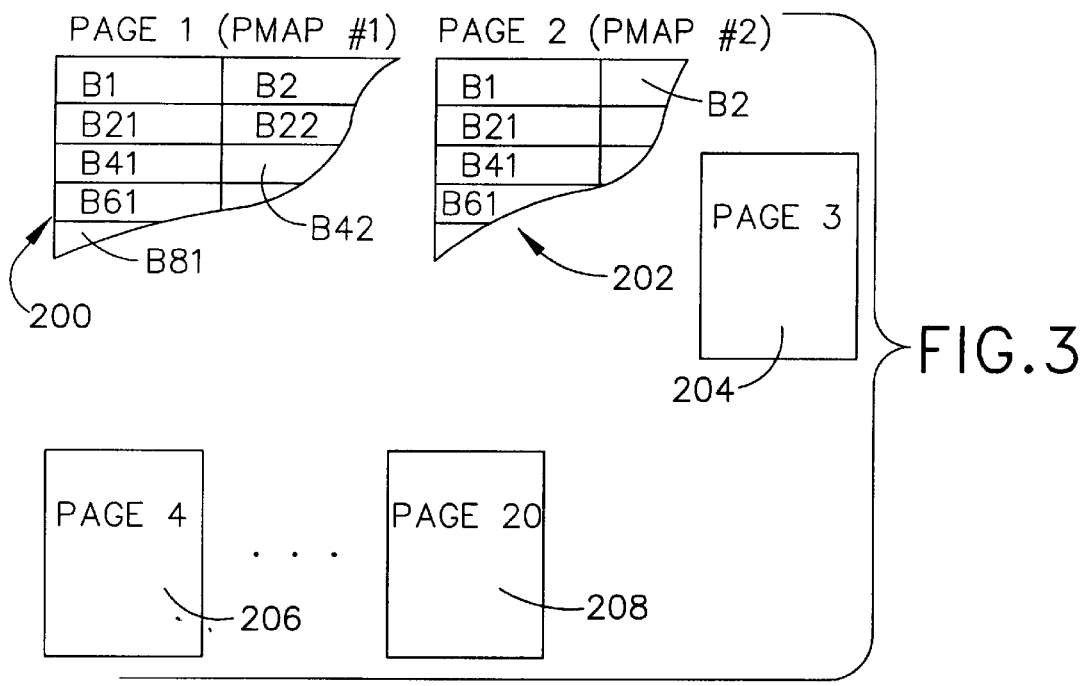
FIG. 3 is a diagrammatic view of a portion of the pages of a print job that is to be printed by the printer of FIG. 1.

FIG. 3 shows a portion of some of the pages of a print job, in which the first page is designated by the reference numeral 200. "Page 1" is divided into tiled blocks having a rectangular shape, and in this example there are twenty (20) blocks for each horizontal swath across the width of the page. Assuming a print resolution of 600 dpi, each block will be 512 pels in the horizontal direction, and 128 pels in the vertical direction. For an 8½×11 inch page, there will be 20 blocks in each horizontal row, and 50 blocks in each vertical column, which provides a PMAP of 1000 tiled blocks.

A "Page 2," designated at reference numeral 202, has the same type of block structure, and is also referred to as PMAP #2. In this example, the print job has 20 total pages, and each of these pages has 1000 tiled blocks making up a PMAP, including the last page (i.e., "Page 20") at reference numeral 208.

Figure 4:
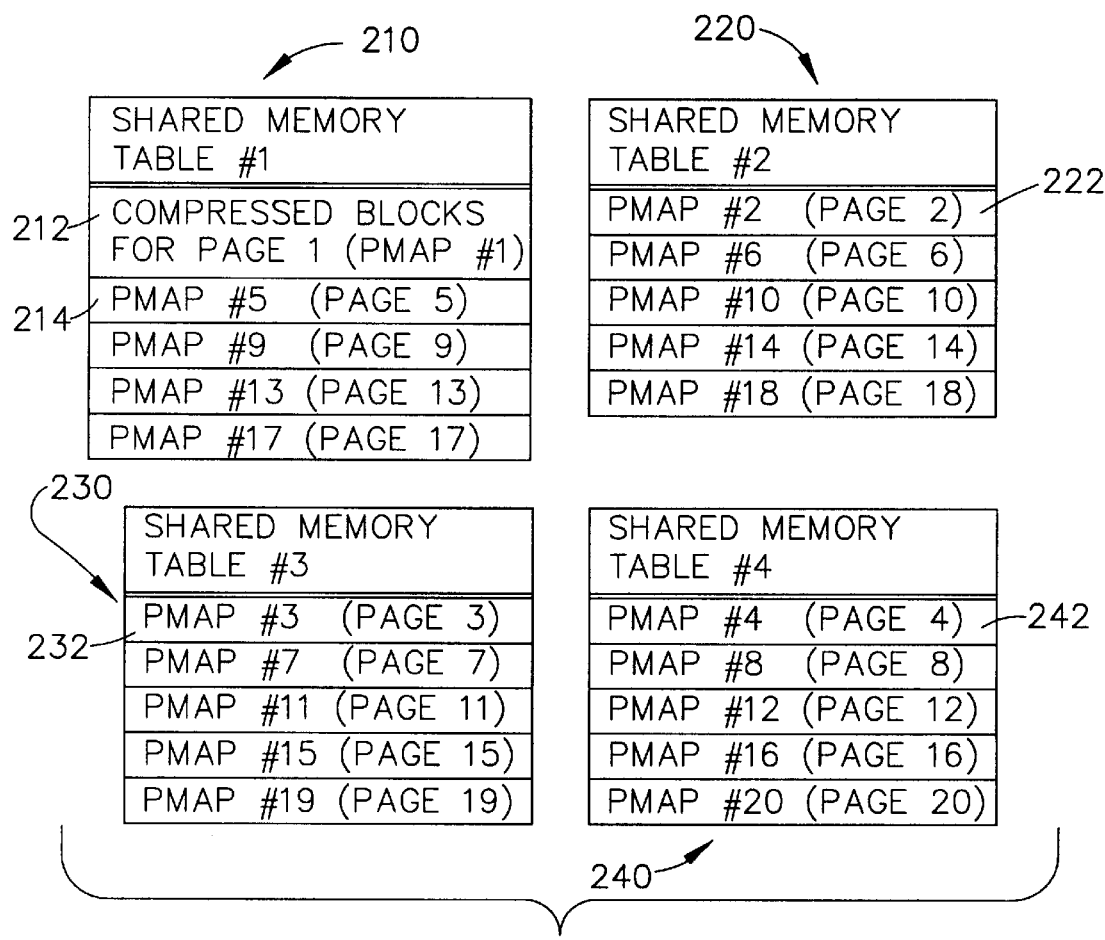
FIG. 4 is a diagrammatic view of the four "shared memory tables" used in conjunction with the printer of FIG. 1.

In the illustrated embodiment of FIG. 4, the present invention uses four (4) shared memory tables. Shared Memory Table #1 is depicted at reference numeral 210, and holds compressed block data for Page 1 of the print job depicted in FIG. 3. These blocks for Page 1 are also referred to as PMAP #1, and are depicted at reference numeral 212. In the preferred embodiment, the next page to be saved to the hard disk drive 38 will be the PMAP #5 (which represents Page 5 of the print job), as designated at reference numeral 214. If the printer continues to require more RAM to be freed, then the PMAP's for Pages 9, 13, and 17 will all be placed into Shared Memory Table #1. The size of Shared Memory Table #1 does not increase to the point where it could hold all five (5) pages (or PMAP's) of print data for these five pages that have been stored on the hard disk drive, but instead has enough blocks of the correct size to hold the blocks of print data for the "largest" page of these five pages. This will be discussed in greater detail below as relating to FIGS. 5 and 6.

Shared Memory Table #2 is depicted at reference numeral 220, and the first page stored in this memory table is Page 2 at reference numeral 222. According to the preferred embodiment of the present invention, the pages that will be stored in Shared Memory Table #2 are the PMAP's for Pages 2, 6, 10, 14, and 18. A similar structure is used for Shared Memory Tables #3 and #4, depicted at reference numerals 230 and 240, respectively. For Shared Memory Table #3, the first page to be stored is the PMAP for Page 3, at reference numeral 232. For Shared Memory Table #4, the first page to be stored is the PMAP #4, as seen at reference numeral 242.

Figure 5A:
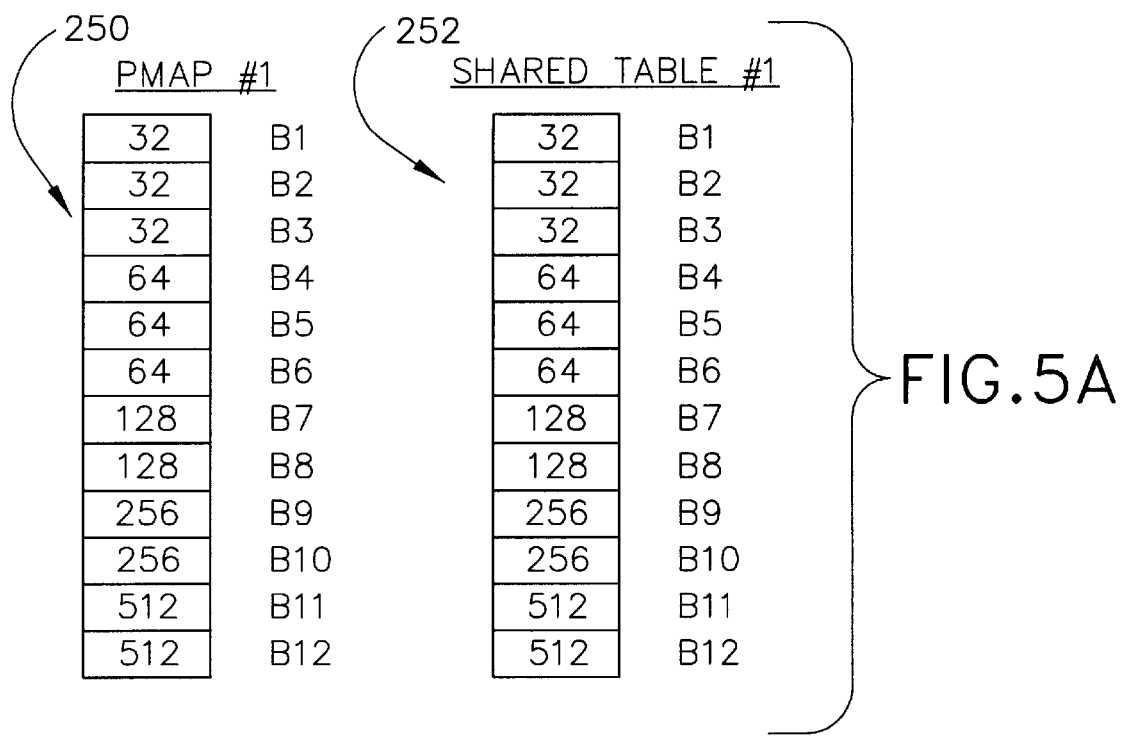
FIGS. 5A and 5B are diagrammatic views of a first example showing the details of bitmap blocks of print data for a page that is placed on a hard disk drive, in which the blocks of data correspond to "empty" memory locations in RAM by a shared memory table.

On FIG. 5A, the blocks for PMAP #1 are depicted at the reference numeral 250. In the preferred embodiment, each block contains compressed bitmap data in the form of 32-bit words. Since each rectangular block contains 65,536 bits of pel data, there could be as many as 2,048 words of data in the form of uncompressed data. Once the data is compressed, it is likely that the number of words to hold all of the compressed pel data will be much less than 2,000. In the present invention, the block size for the PMAP are stored in groups of sizes corresponding to powers of two. In other words, if 31 words were needed to define a particular block, then block size group "32" would be used to hold that data. However, if the block needed 33 words to define its compressed bitmap data, then that block's data would be stored in block size group "64."

In the illustrated example of FIG. 5A, it can be seen that there are twelve (12) blocks of bitmap data after compression, and these blocks are designated as "B1–B12." Since Shared Memory Table #1 must hold the page data for PMAP #1, then the Shared Memory Table #1 will require 12 blocks at reference numeral 252, and these blocks must be sized accordingly to match up to the same sizes of blocks used in PMAP #1.

Figure 5B:
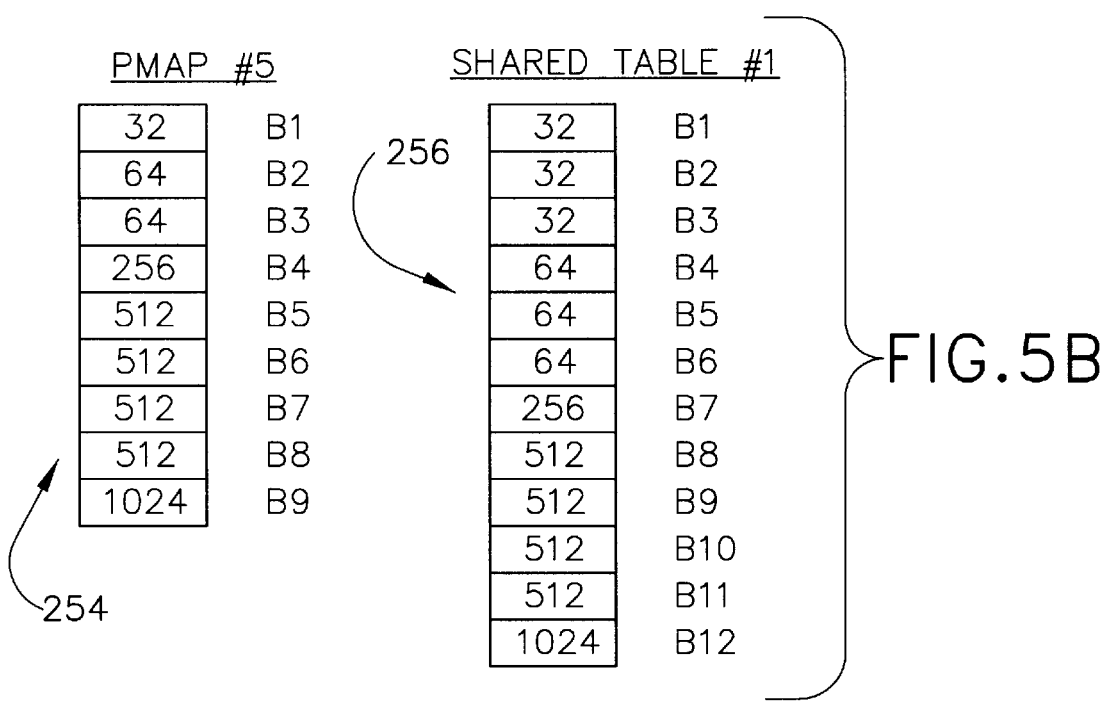

In FIG. 5B, the next page of data is to be placed in Shared Memory Table #1. The next page will be PMAP #5 which (as depicted at reference numeral 254) only contains 9 blocks of data (i.e., "B1–B9"). The Shared Memory Table #1 at reference numeral 256 will contain twelve (12) blocks, since Shared Memory Table #1 must not only be able to hold the print data for PMAP #5, but also for PMAP #1. As can be seen in the example of FIG. 5B, more blocks of the size 512 have been added than were needed to hold PMAP # 1, and a very large block (B12) is added to hold 1024 data words, since block B9 of PMAP #5 was of that size.

The examples of FIGS. 6A and 6B also relate to different PMAP's for Pages 1 and 5, and again uses Shared Memory Table #1. PMAP #1 is depicted at reference numeral 260, and is identical to the PMAP #1 on FIG. 5A at 250. Shared Memory Table #1 at reference numeral 262 will contain the same twelve (12) blocks of data which are of the same size as PMAP #1 at 260.

In FIG. 6B, PMAP #5 must now be placed on disk, and enough blank RAM space must be reserved in Shared Memory Table #1 so that these blocks can later be collected back from the hard disk drive 38. At reference numeral 264, it can be seen that PMAP #5 has 21 blocks. Therefore, the Shared Memory Table #1 at 266 must also contain at least 21 blocks. However, by inspecting FIG. 6B, one can see that Shared Memory Table #1 contains 24 blocks, and not 21 blocks which is what would be needed to hold PMAP #5. This is because PMAP #1 required two blocks of size 256, and two blocks of size 512. These larger blocks must still be made available in Shared Memory Table #1 after PMAP #5 has been stored on the hard disk drive. Therefore, blocks B22, B23, and B24 must stay in Shared Memory Table #1, and consequently the need for three extra blocks as compared to PMAP #5.

Figure 7:
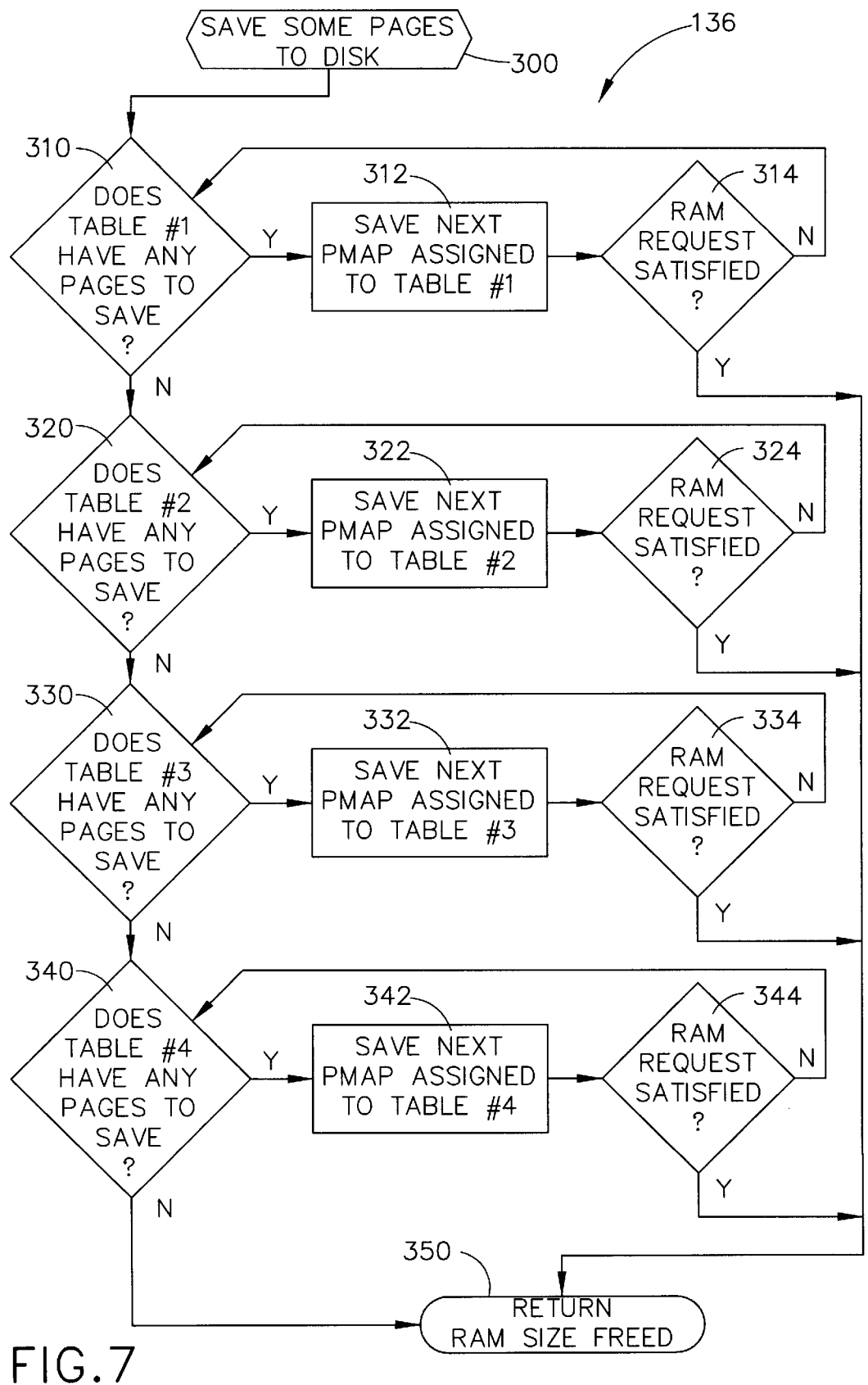
FIG. 7 is a flow chart showing the details of logical operations for the "Save Some Pages to Disk" routine, as introduced on FIG. 2.

The "Save Some Pages to Disk" routine 136 is depicted in detail on FIG. 7, starting at a step 300. At a decision block 310, it is determined whether or not any pages assigned to Shared Memory Table #1 can be saved to the hard disk drive. If the answer is YES, a function block 312 will save the next PMAP assigned to Shared Memory Table #1. A decision block 314 will determine whether or not the request to free up some RAM has been satisfied by saving this next page. If not, the logic flow is directed back to decision block 310 to see if there are any further pages corresponding to Shared Memory Table #1 that can be saved. In the twenty-page print job example depicted on FIGS. 3 and 4, only five pages are to be stored in Shared Memory Table #1, and the printer may well require further pages to be saved to hard disk drive 38 to satisfy the RAM request that initiated the Disk Collation Task. If that is the case, then the result at decision block 310 will eventually become NO, and the logic flow will be directed to a decision block 320. On the other hand, if decision block 314 determines that the amount of RAM requested was finally freed up, then the logic flow will be directed to a step 350 which returns from this routine, and also passes a variable indicating the size of the RAM that was freed.

At decision block 320, it is determined whether or not any pages assigned to Shared Memory Table #2 can be saved to the hard disk drive. If the answer is YES, a function block 322 saves the next PMAP assigned to Shared Memory Table #2. In the twenty-page example print job of FIGS. 3 and 4, these PMAP's would correspond to Pages 2, 6, 10, 14 and 18. If the request to free up more RAM has not been satisfied during these procedures to save each page, the logic flow will continue to be directed from decision block 324 back to decision block 320. The answer at 320 will eventually become NO, and the logic flow will then arrive at a decision block 330. If the result becomes YES at 324, then the routine returns at 350.

Decision block 330 determines whether or not any pages assigned to Shared Memory Table #3 has any pages that can be saved to disk. If so, a function block 332 saves the next PMAP assigned to Shared Memory Table #3, and a decision block 334 determines whether or not the amount of RAM requested has been satisfied. If the result is YES at 334, this routine returns at 350. If the result instead continues to be NO, the logic flow continues to loop back to decision block 330, until the answer at that decision block becomes NO.

In that event, the logic flow arrives at a decision block 340 which determines whether or not any pages assigned to Shared Memory Table #4 can be saved on hard disk drive 38. If the answer is YES, then a function block 342 will save the next PMAP assigned to Shared Memory Table #4. A decision block 344 will determine whether or not the RAM request has been satisfied and, if YES, the routine returns at 350. If the answer continues to be NO at 344, the logic flow continues to loop back to decision block 340 until all of the pages of this particular print job have been saved on the hard disk. At that point, the logic flow must return at 350 with the RAM size that has been freed. If all the pages for all the print jobs that are resident in printer 10 have been stored on the hard disk drive 38, but they nevertheless fail to satisfy the requirement to free up a sufficient amount of RAM, then decision block 138 (see FIG. 2) will determine that there is a need to collapse the shared memory tables.

Figure 8:
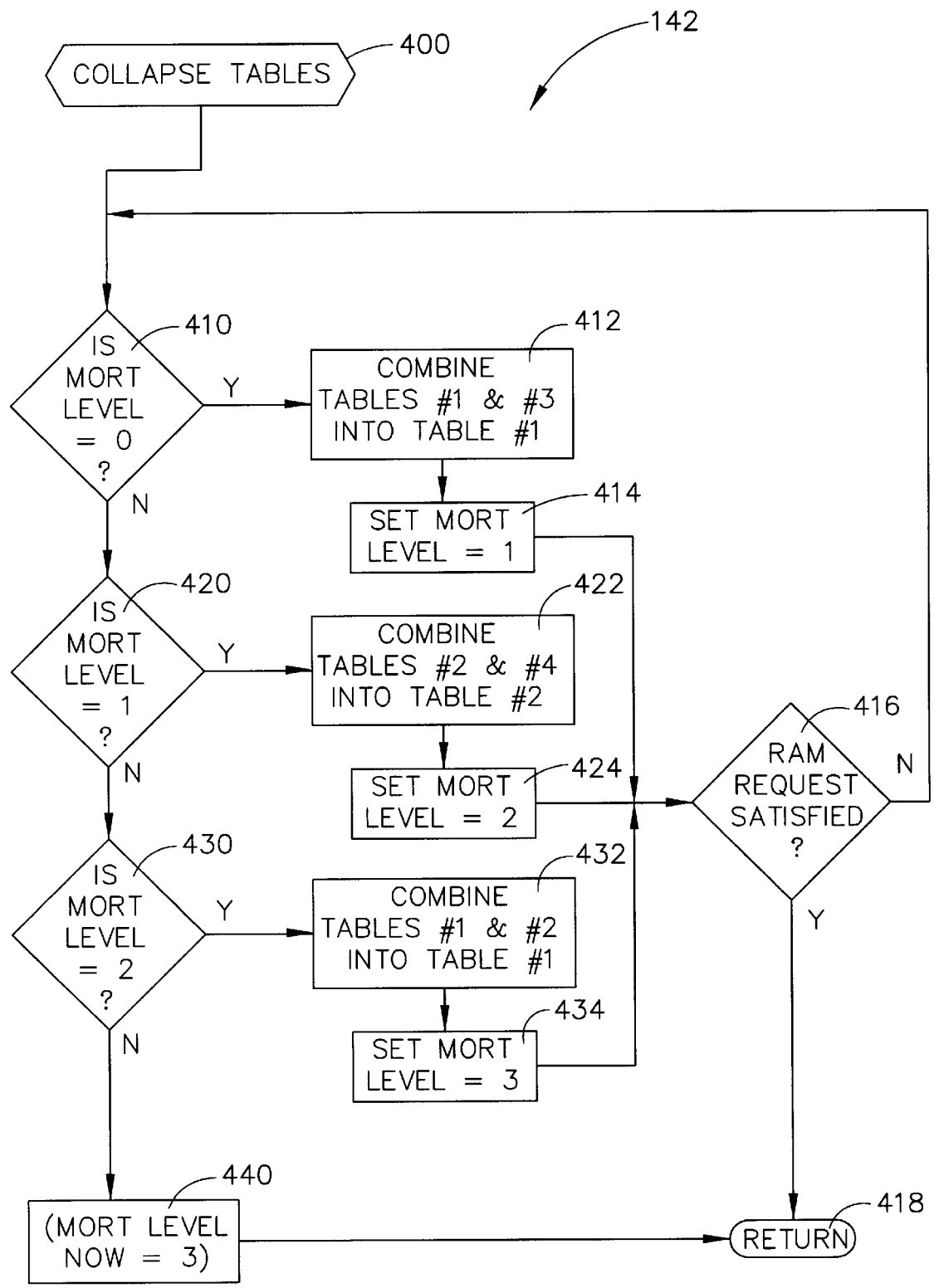
FIG. 8 is a flow chart showing the details of logical operations for the "Collapse Tables" routine, as introduced on FIG. 2.

The "Collapse Tables" routine 142 is depicted in detail on FIG. 8, starting at a step 400. To understand FIG. 8, it is important to understand a variable called "Mort Level." The variable Mort Level represents a "mortification" level, which is a measure of how desperate the printer is to free up some RAM. This measure of desperation essentially boils down to how much performance loss will the printer accept in order to free up this RAM.

Assuming the mortification level is equal to zero (0), a decision block 410 will direct the logic flow to a function block 412 that combines Shared Memory Table #1 with Shared Memory Table #3, with the result being placed into Shared Memory Table #1. At function block 414 the mortification level is set to one (1). After this occurs, a decision block 416 determines whether or not the RAM request has been satisfied. If the answer is YES, then this routine returns at 418. If the result is NO, the logic flow loops back and the mortification level is tested again.

Since function block 414 just set the mortification level to one (1), then the logic flow will pass through decision block 410 down to a decision block 420. At this point, the logic flow will be directed to a function block 422 that combines Shared Memory Table #2 with Shared Memory Table #4, and the result is placed into Shared Memory Table #2. A function block 424 now sets the mortification level equal to two (2). After this step, the printer is down to only two shared memory tables. Decision block 416 now determines whether or not the RAM request has been satisfied. If the answer is NO, then the logic flow is directed back through decision blocks 410 and 420 and the logic flow arrives at a decision block 430 that determines whether or not the mortification level is equal to two (2).

Since the printer is now down to only two shared memory tables, the logic flow is directed to a function block 432 which combines the last two shared memory tables into a single table, now referred to as Shared Memory Table #1. A function block 434 now sets the mortification level to three, and decision block 416 determines whether or not the RAM request has been satisfied. If not, the logic flow will travel back through decision blocks 410, 420 and 430, thereby arriving at a step 440 which presumes that the mortification level is now equal to three. When that occurs, this routine returns at 418, regardless of whether any RAM space has been freed or not. If insufficient (or no) RAM space has been freed, then the Disk Collation Task may be terminated prematurely (see steps 144 and 146 on FIG. 2).

When using a modern laser printer of sufficient processing power and relatively fast hard disk access times, the printer that uses the teachings of the present invention will typically be able to run at its overall rated print speed with only two (2) shared memory tables, at least in the simplex mode. This will be true because, with at least two shared memory tables, one of the pages can be sent to the print engine for printing while at the same time another one of the pages is being retrieved from the hard disk drive. However, if the shared memory tables are collapsed down to a single table (as per function block 432), then it will likely negatively impact the rated print speed by a certain percentage.

When shared memory tables are combined, it is critical that the resulting shared memory table contain sufficient numbers of blocks to hold all of the print data that is being reserved for the larger of the two shared memory tables before their combination. Of course, the proper block sizes and numbers must also be maintained so that the larger of the two shared memory tables will still have available the larger data sized blocks available to it.

The use of the shared memory tables can drastically improve the actual print speed of a job after some or all of its pages have been sent to the hard disk drive for temporary storage. The interleaving of pages also has a large beneficial effect on maintaining the rated print speed for a particular print job. By interleaving the pages between the hard disk drive and RAM, the slower access times to read the data back from the hard drive will be spread over more than one page that needs to be printed, and this allows the printer to continue printing at its rated speed.

It will be understood that bulk memory storage devices other than a hard disk drive could be used to temporarily hold the print data for the PMAP's without departing from the principles of the present invention. Similarly, using tiled PMAP's and the use of compressed bitmap data is only one method of manipulating print data that can be useful in the present invention. Also, the maximum number of shared memory tables could be easily changed without departing from the principle of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In a printer having a memory circuit containing a quantity of random access memory (RAM) and a bulk memory storage device, a processing circuit, and a communications port that is effectively connected to at least one external device: a method of temporarily storing print data for a plurality of pages of a print job before actual printing of said pages, said method comprising the steps of:

(a) receiving a plurality of pages of print data from at least one external device via said communications port, and temporarily storing said pages of print data in said RAM;

(b) receiving a request to free-up a predetermined quantity of memory locations within said RAM for use by said printer;

(c) repeatedly, retrieving at least one of said plurality of pages of print data from said RAM and temporarily storing said at least one of said plurality of pages of print data in said bulk memory storage device in a manner such that said pages of print data being stored on said bulk memory storage device are interleaved with adjacent pages of print data that remain in said RAM, until sufficient memory locations within said RAM become available within said printer to satisfy said request.

2. The method as recited in claim 1, further comprising the step of retrieving each of said plurality of pages of print data from said bulk memory storage device, storing these pages of print data in RAM, and forwarding these pages of print data to a print engine so as to maintain the overall rated print speed of said printer.

3. The method as recited in claim 1, wherein said bulk memory storage device comprises a hard disk drive.

4. The method as recited in claim 1, further comprising the sub-step, during the step of repeatedly retrieving at least one of said plurality of pages of print data from said RAM and temporarily storing it in said bulk memory storage device, of creating a shared memory table within said RAM that has sufficient capacity to hold all of the print data for at least one page.

5. The method as recited in claim 4, wherein said shared memory table contains pointer information that traces each of the blocks of print data that makes up said at least one of said plurality of pages of print data, and wherein sufficient "empty" RAM capacity is reserved within said shared memory table for each of said blocks, according to the size of each block, such that the page of print data, when retrieved from said bulk memory storage device, will be quickly collected, block-by-block, and stored into the "empty" RAM memory locations that are correspondingly sized for each of these blocks.

6. The method as recited in claim 4, further comprising the step of creating a plurality of shared memory tables within said RAM such that alternating pages of print data are placed into a different one of said plurality of shared memory tables up to the maximum number of these shared memory tables, so that pages of print data, when retrieved from said bulk memory storage device, will be quickly collected, block-by-block, and stored into the "empty" RAM memory locations of a different one of said shared memory tables for adjacent pages of print data using minimal memory overhead in RAM, thereby very quickly obtaining the print data from more than one page that was stored on said bulk memory storage device and presenting this print data to a print engine.

7. A printing apparatus, comprising:
(a) a memory circuit for storage of data, said memory circuit containing a quantity of random access memory (RAM) and a bulk memory storage device;
(b) a communications port that is effectively connected to at least one external device and to said memory circuit, said communications port providing data from said at least one external device to said memory circuit; and
(c) a processing circuit that is configured to control the flow of data between said memory circuit and said communications port, said processing circuit also being configured to delimit print data between individual pages of a print job received by said communications port and to control which portion of said memory circuit in which each of said individual pages of a print job is temporarily stored before final printing, wherein:
(i) said processing circuit also being configured to initially store said print data corresponding to a plurality of individual pages into said RAM; and
(ii) at times when a request occurs to free-up a predetermined quantity of memory locations within said RAM for use by said printing apparatus, said processing circuit being further configured to retrieve at least one of said plurality of pages of print data from said RAM and to temporarily store said pages of print data in said bulk memory storage device in a manner such that said pages of print data being stored on said bulk memory storage device are interleaved with adjacent pages of print data that remain in said RAM, until sufficient memory locations within said RAM become available within said printing apparatus to satisfy said request.

8. The printing apparatus as recited in claim 7, wherein said processing circuit is further configured to retrieve each of said plurality of pages of print data from said bulk memory storage device, store these pages of print data in RAM, and forward these pages of print data to a print engine so as to maintain the overall rated print speed of said printer.

9. The printing apparatus as recited in claim 7, wherein said bulk memory storage device comprises a hard disk drive.

10. The printing apparatus as recited in claim 7, wherein said processing circuit is further configured to create within said RAM a shared memory table that has sufficient capacity to hold all of the print data for at least one page for pages that are being stored on said bulk memory storage device.

11. The printing apparatus as recited in claim 10, wherein said shared memory table contains pointer information that traces each of the blocks of print data that makes up said at least one of said plurality of pages of print data, and wherein sufficient "empty" RAM capacity is reserved within said shared memory table for each of said blocks, according to the size of each block, such that the page of print data, when retrieved from said bulk memory storage device, will be quickly collected, block-by-block, and stored into the "empty" RAM memory locations that are correspondingly sized for each of these blocks.

12. The printing apparatus as recited in claim 11, wherein said processing circuit is yet further configured to create within said RAM a plurality of shared memory tables such that alternating pages of print data are placed into a different one of said plurality of shared memory tables up to the maximum number of these shared memory tables, so that pages of print data, when retrieved from said bulk memory storage device, will be quickly collected, block-by-block, and stored into the "empty" RAM memory locations of a different one of said shared memory tables for adjacent pages of print data using minimal memory overhead in RAM, thereby very quickly obtaining the print data from more than one page that was stored on said bulk memory storage device and presenting this print data to a print engine.

13. In a printer having a memory circuit containing a quantity of random access memory (RAM) and a bulk memory storage device, a processing circuit, and a communications port that is effectively connected to at least one external device: a method of temporarily storing print data for a plurality of pages of a print job before actual printing of said pages, said method comprising the steps of:
(a) receiving a plurality of pages of print data from at least one external device via said communications port, and temporarily storing said pages of print data in said RAM;
(b) receiving a request to free-up a predetermined quantity of memory locations within said RAM for use by said printer;
(c) creating a shared memory table within said RAM that has sufficient capacity to hold all of the print data for at least one of said plurality of pages in said RAM, and repeatedly (i) retrieving said at least one of said plurality of pages of print data from said RAM, and (ii) temporarily storing said at least one page of print data in said bulk memory storage device, until sufficient memory locations within said RAM become available to satisfy said request.

14. The method as recited in claim 13, further comprising the step of retrieving each of said plurality of pages of print data from said bulk memory storage device, temporarily storing these pages of print data in said shared memory table, and forwarding these pages of print data to a print engine so as to maintain the overall rated print speed of said printer.

15. The method as recited in claim 13, wherein said bulk memory storage device comprises a hard disk drive.

16. The method as recited in claim 13, wherein said shared memory table contains pointer information that traces each of the blocks of print data that makes up said at least one of said plurality of pages of print data, and wherein sufficient "empty" RAM capacity is reserved within said shared memory table for each of said blocks, according to the size of each block, such that said page of print data, when retrieved from said bulk memory storage device, will be quickly collected, block-by-block, and stored into the "empty" RAM memory locations that are correspondingly sized for each of these blocks.

17. The method as recited in claim 13, further comprising the step of creating a plurality of shared memory tables within said RAM such that alternating pages of print data are placed into a different one of said plurality of shared memory tables up to the maximum number of these shared memory tables, so that pages of print data, when retrieved from said bulk memory storage device, will be quickly collected, block-by-block, and stored into the "empty" RAM memory locations of a different one of said shared memory tables for adjacent pages of print data using minimal memory overhead in RAM, thereby very quickly obtaining the print data from more than one page that was stored on said bulk memory storage device and presenting this print data to a print engine.

18. The method as recited in claim 17, further comprising the step of collapsing at least two of said plurality of shared memory tables with one another, thereby decreasing the amount of memory space in RAM needed to store said plurality of shared memory tables.

* * * * *